US010599422B1

(12) United States Patent
Sounderadas et al.

(10) Patent No.: US 10,599,422 B1
(45) Date of Patent: Mar. 24, 2020

(54) INTELLIGENT DETECTION AND PREVIEW OF ENHANCED APPLICATION FUNCTIONALITY

(71) Applicant: Bank of America Corporation, Charlotte, NC (US)

(72) Inventors: Vijayakumar Sounderadas, Tamil Nadu (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/194,749

(22) Filed: Nov. 19, 2018

(51) Int. Cl.
*G06F 8/658* (2018.01)
*G06Q 30/00* (2012.01)
*G06F 9/451* (2018.01)
*G06N 20/00* (2019.01)

(52) U.S. Cl.
CPC .............. *G06F 8/658* (2018.02); *G06F 9/453* (2018.02); *G06N 20/00* (2019.01); *G06Q 30/016* (2013.01)

(58) Field of Classification Search
None
See application file for complete search history.

(56) References Cited

U.S. PATENT DOCUMENTS

| | | | |
|---|---|---|---|
| 7,353,234 B2 | 4/2008 | Kimball et al. | |
| 7,620,894 B1* | 11/2009 | Kahn | G06F 3/0481 715/707 |
| 8,032,839 B2* | 10/2011 | Mall | G06F 3/048 715/707 |
| 9,658,735 B2 | 5/2017 | Trefler et al. | |
| 10,083,466 B1* | 9/2018 | Chakraborty | G06Q 30/016 |
| 10,346,284 B1* | 7/2019 | Yang | G06F 8/30 |
| 2018/0014168 A1* | 1/2018 | Lau | H04M 7/0048 |
| 2018/0275980 A1* | 9/2018 | Bershansky | G06F 8/65 |
| 2018/0357083 A1* | 12/2018 | Chauhan | G06Q 30/0282 |
| 2019/0258949 A1* | 8/2019 | Reyes | G06F 16/24575 |

* cited by examiner

*Primary Examiner* — Philip Wang
(74) *Attorney, Agent, or Firm* — Banner & Witcoff, Ltd.; Michael A. Springs (57) ABSTRACT

A computing platform having at least one processor, a memory, and a communication interface may establish a first connection, via the communication interface, with a remote client device and initiate a first client session. The computing platform may establish a second connection, via the communication interface, with an intelligent helper agent. While the second connection is established, the computing platform may receive new feature information relevant to the first client session as determined by comparing the new feature information to a first client persona. The computing platform may then transmit a first notification, via the communication interface, to the remote client device which, when executed by the remote client device, causes the first notification to be displayed on the remote client device.

18 Claims, 5 Drawing Sheets

INTELLIGENT DETECTION AND PREVIEW OF ENHANCED APPLICATION FUNCTIONALITY

FIELD

Aspects of the embodiments relate to a database system that provides a technological advancement over existing database systems by identifying whether a new feature may be relevant for particular users based on customized user personas, and automatically or selectively implementing the new feature on a remote client device.

BRIEF SUMMARY

Aspects of the disclosure provide effective, efficient, scalable, and convenient technical solutions that address and overcome the technical problems associated with deploying computing infrastructure and updating client user devices. In particular, one or more aspects of the disclosure provide techniques for tailoring notifications concerning feature updates, and/or automatically executing feature updates, based on customized user personas which may include such criteria as user demographics, prior user feedback, and/or historical user interactions with a particular online/mobile channel.

In accordance with one or more embodiments, a computing platform having at least one processor, a memory, and a communication interface may establish a first connection, via the communication interface, with a remote client device and initiate a first client session. The computing platform may establish a second connection, via the communication interface, with an intelligent helper agent. While the second connection is established, the computing platform may receive new feature information relevant to the first client session as determined by comparing the new feature information to a first client persona. The computing platform may then transmit a first notification, via the communication interface, to the remote client device which, when executed by the remote client device, causes the first notification to be displayed on the remote client device.

In accordance with some aspects, the computer-readable instructions, when executed by the at least one processor, may cause the computing platform to establish a connection with a database storing information relating to historical product updates, client feedback, and client usage patterns. The computing platform may create the first client persona based, at least in part, on the database information. In some examples, the intelligent helper agent may determine whether the new feature information is relevant to the first client session by comparing the first client persona to a machine learning dataset.

In accordance with other aspects, the computer-readable instructions, when executed by the at least one processor, may cause the computing platform to establish a third connection with the remote client device. While the third connection is established, the computing platform may initiate a second client session executing the new feature information responsive to instructions received from the remote client device.

In accordance with yet other aspects, the computer-readable instructions, when executed by the at least one processor, may cause the computing platform to execute the new feature information on the remote client device upon determining that automatic execution is appropriate based on the first client persona.

In accordance with still other aspects, the computer-readable instructions, when executed by the at least one processor, may cause the computing platform to establish a third connection with the remote client device. While the third connection is established, the computing platform may initiate a second client session containing instructions for guiding a user through installation of the new feature information on the remote client device.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part thereof, and in which is shown by way of illustration various embodiments in which the disclosure may be practiced. It is to be understood that other embodiments may be utilized and structural and functional modifications may be made without departing from the scope and spirit of the present disclosure.

It is noted that various connections between elements are discussed in the following description. It is noted that these connections are general and, unless specified otherwise, may be direct or indirect, wired or wireless, and that the specification is not intended to be limiting in this respect.

The features disclosed herein overcome one or more drawbacks in prior art database systems to provide a technological improvement.

Customer feedback often is anonymized and feature suggestions are taken as group to be implemented as appropriate. Once a new feature is launched, a generic announcement may be made, e.g., by email notification or as a message displayed at login, describing the new features. Because many individuals are now inundated with notifications and advertising materials of various kinds, such announcements may be ignored or at least not read in their entirety. As a result, a customer who made a suggestion that was later implemented may not become aware of the changes. It would be desirable to have an intelligent feature tracker that may enable notifications of feature changes to be tailored to customers who are likely to be interested in the particular change, for example based on criteria such as prior customer feedback, customer demographics, and usage patterns.

An intelligent helper agent as described herein may be effective for tracking old and new features, such as features that are modified or added during successive version updates. In some examples, the intelligent helper agent may maintain a complete audit log of feature changes for a period of time. When, for example, a user interacts with a platform for which a changed feature is applicable, the intelligent helper agent may appropriately guide the user to implement and/or use the changed feature. In some aspects, changes may be mapped as metadata in an active system, which may enable the helper agent to identify differences in features and intelligently notify users about relevant changes based on the user's previous interactions. For example, the intelligent helper agent may determine that a user most recently interacted with an earlier version of a platform which did not include a new or changed feature. This determination may prompt the intelligent helper agent to notify the user of the new or changed feature, and/or may be weighed along with other criteria, as described herein, to determine whether the user should be notified of the new or changed feature and/or assisted in connection with implementation.

Aspects of the disclosure as described herein may provide a number of advantages over currently available technologies, including helping a service provider to provide more relevant content and services to customers. In some aspects, a computing platform may capture customer feedback with respect to proposed features or changes in form of unstructured data such as voice, text, and/or video, allowing customers to easily provide input in natural language, such as described in commonly owned Chakraborty et al. U.S. Pat. No. 10,083,466, the disclosure of which is hereby incorporated by reference in its entirety.

Figure 1:
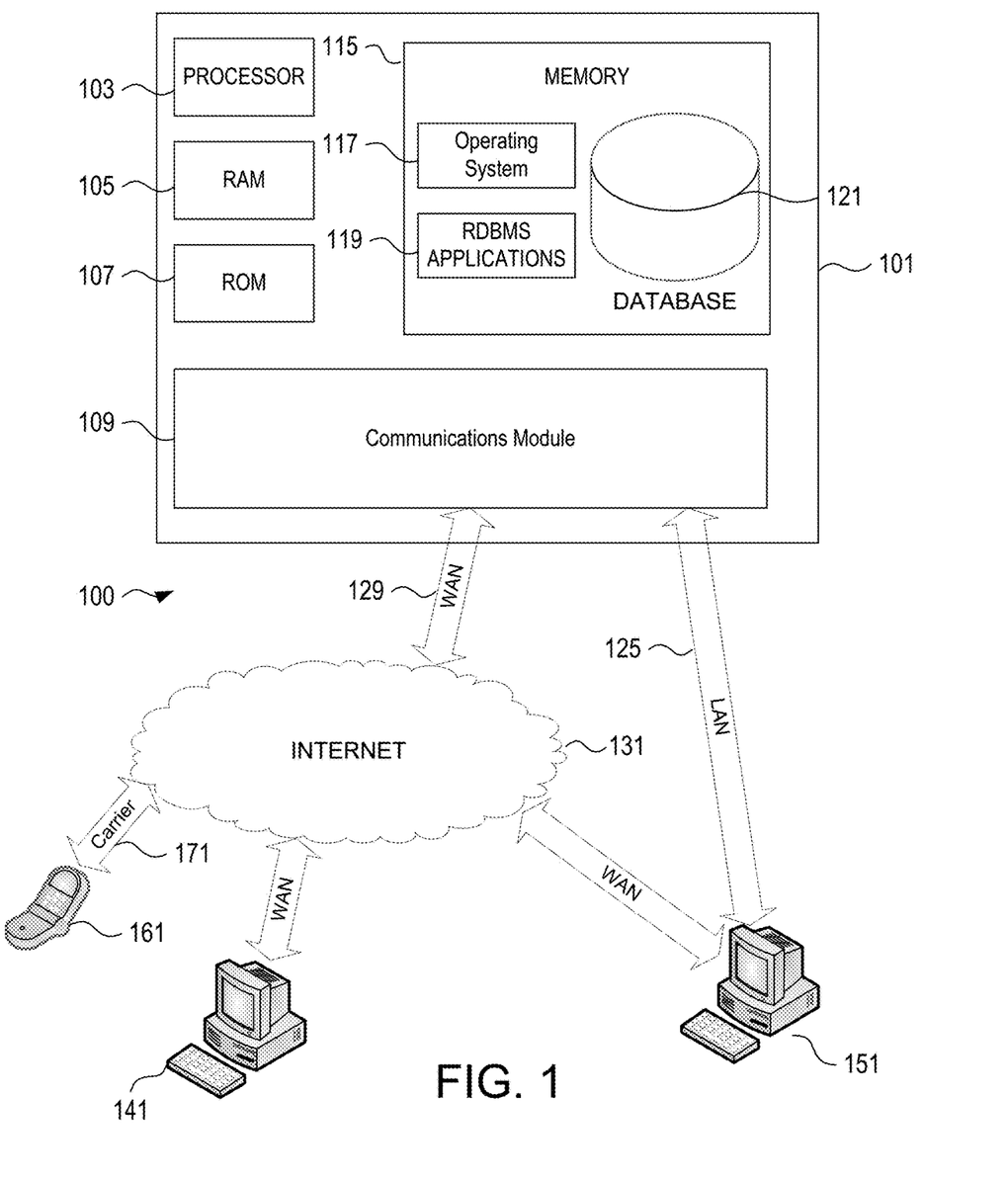
FIG. 1 illustrates an example of a suitable computing system environment that may be used according to one or more illustrative embodiments.

FIG. 1 illustrates an example of a suitable computing system environment 100 that may be used according to one or more illustrative embodiments. The computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling the computing device 101 to perform various functions. For example, memory 115 may store software used by the computing device 101, such as an operating system 117, application programs 119, and an associated database 121. Also, some or all of the computer executable instructions for the computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech-recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
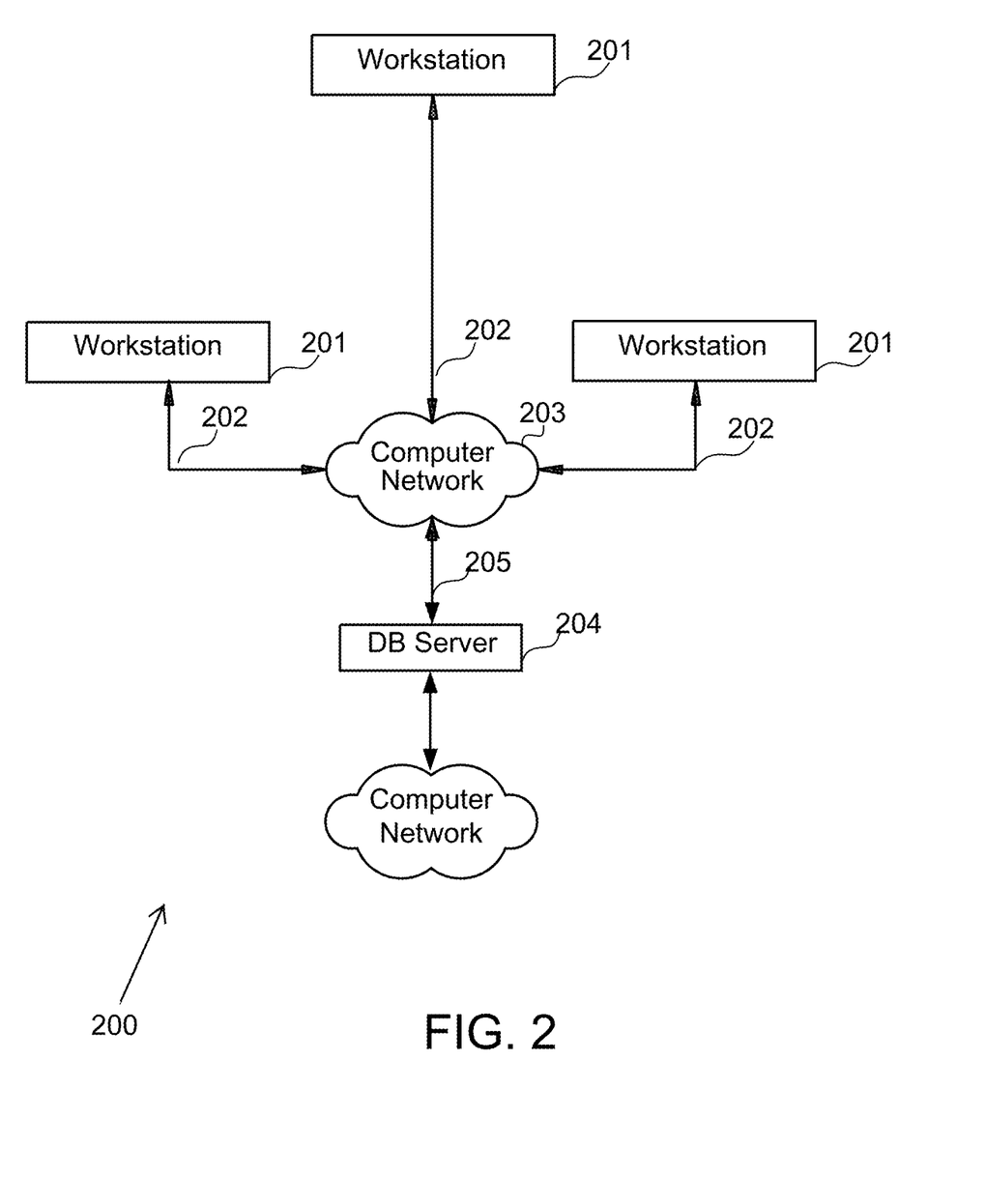
FIG. 2 shows an illustrative system for implementing example embodiments according to some aspects of the disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants (clients).

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

Database servers may serve different types of databases, including a relational database, e.g., SQL database, object-oriented databases, linear databases, self-referential databases, and other types of databases. In some embodiments, the processes executing on a database administrator's computer may support a graphical user interface (GUI) that provides on a database (DB) administrator's desktop a near real-time view of multiple SQL server instances. Because, in those embodiments, monitoring configuration is not required on a SQL server, the GUI tool may appear to be essentially instantaneous to the DB administrator so that any newly built SQL server can be viewed without having to prepare the server from monitoring standpoint (e.g., to provide a plug-and-play like functionality).

Information about the SQL Server status may be presented in a graphical user interface (GUI) format where status information for all of the listed database servers is presented in one integrated view in an automated manner. A monitoring process may read a list of SQL Server Instances from a designated Server detail repository (in form of a database) of organization or from a flat text input file and then connects to each listed SQL server to query the System Catalogs of the SQL Server engine. Because the monitoring process runs from a central server, configuration demand at the SQL server's side is circumvented. The monitoring process interprets the received information from the SQL servers and updates the GUI. By monitoring and obtaining additional information about SQL features for specified servers through the GUI, the database administrator or any other user (or self-learning analytics engine) may then report and/or fix detected issues. The processes may use a 32-bit operating system, thus circumventing a complicated monitoring infrastructure that demands extra skill sets and significant cost with infrastructure dependency.

A user's channel preference and language preference may be determined from user input and/or through machine learning based on the user's previous interactions with the computing platform. Customer type may include, for example, categorizing users as existing customers or new customers. Appropriate weighting may be assigned based on customer type, e.g., channels that may be better configured for experienced users may be assigned a higher weighting for existing customers and a lower weighting for new users. Similarly, channels that may be better configured for inexperienced users may be assigned a lower weighting for existing customers and a higher weighting for new users.

Figure 3:
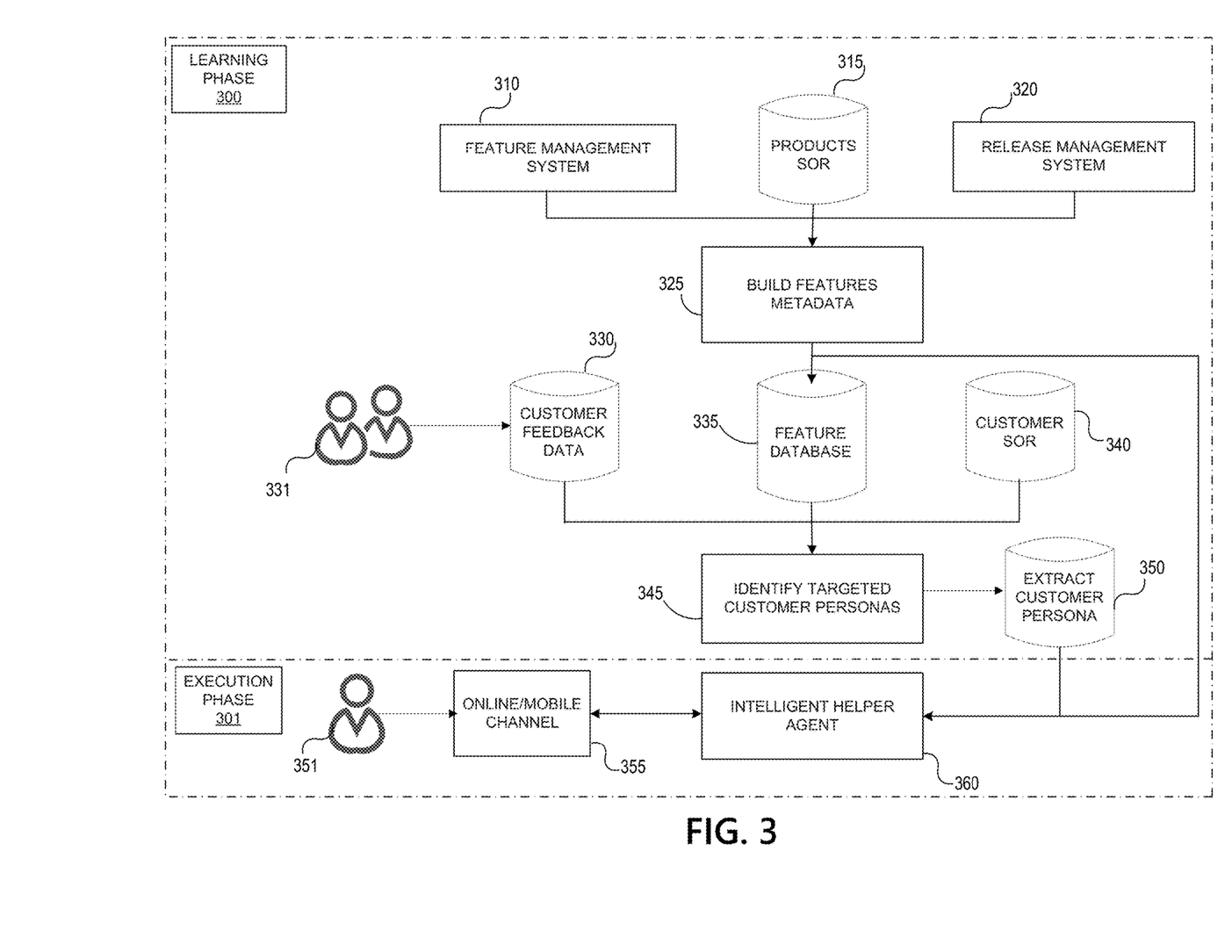
FIG. 3 depicts a method of identifying and implementing new features that may be relevant to a particular client in accordance with one or more example embodiments.

FIG. 3 shows an illustrative flow diagram for one or more example embodiments as described herein and which includes a training or learning phase 300 during which the computing system processes the features and an execution phase 301 during which the computing system guides users in connection with the installation and/or use of new or changed features. During the learning phase 300, the computing system 100 may use metadata 325 to track changes in an application. As features are updated, feature management system 310 may track all historical feature changes; a products system of record (SOR) 315 may track products; and a release management system 320 may track the timing and/or other details of product releases. During the learning phase 300, in addition to gathering information from such various sources as described above, the computing system may receive information, such as business rules, from an administrative computing device (not illustrated). Based on the various raw information received, a feature database 335 may map and store the state mode of application changes. In the event of a blackout, the feature database 335 may track all fine state changes and match the state machine for a previous release, for example.

Targeted customer personas 345 may be developed by processing feedback data 330 received from system users 331, the feature database 335, and a customer SOR 340 which may include such information as client demographics and usage patterns. In some examples, initial client personas may be assigned by an administrator and then updated through machine learning as data is received from such various sources. From the targeted customer personas 345, individual customer personas 350 may be extracted and may contain detailed information with respect to prior usage patterns including, for example, which version of a product that an individual most recently used and whether and to what extent the user previously engaged a feature that has been updated.

The execution phase 301 may begin, for example, by a user 351 initiating a client session by launching an application 355 that includes one or more new or changed features. The intelligent feature agent 360 initially may determine, based on the customer persona 350, whether to notify the user 351 with respect to the new or changed feature(s). The intelligent feature agent 360 also may audit user actions during the client session and assist the user as needed in completing actions with respect to the new or updated feature. For example, more detailed instructions may be provided to a user who is experiencing difficulty in implementing new features as evidenced, for example, by taking incorrect steps or unduly repeating steps. Conversely, instructions may be minimized or omitted for a user who proficiently executes steps without any missteps. The intelligent feature agent 360 also may acquire context-based feedback from the user during the client session 355. Such feedback may be transmitted and processed by the computing system 100 in the same manner as customer feedback 330 as previously described.

Whether and to what extent the intelligent feature agent 360 is activated during a given client session may be based, in part, on a customer confidence factor. For example, the intelligent feature agent 360 may determine the frequency, if any, that a user has engaged assistance offered for a new or changed feature. If the user did not engage the assistance during his or her most recent client session, for example, a high customer confidence factor may be assigned whereupon the intelligent feature agent 360 may be deactivated unless and until the user accesses incorrect steps for the intended action or otherwise encounters difficulties in completing a task. The intelligent feature agent 360 conversely may provide more detailed instructions for a user who repeatedly engages the assistance offered, for example. The intelligent feature agent 360 also may solicit more extensive feedback from users who specifically requested the feature changes.

Figure 4:
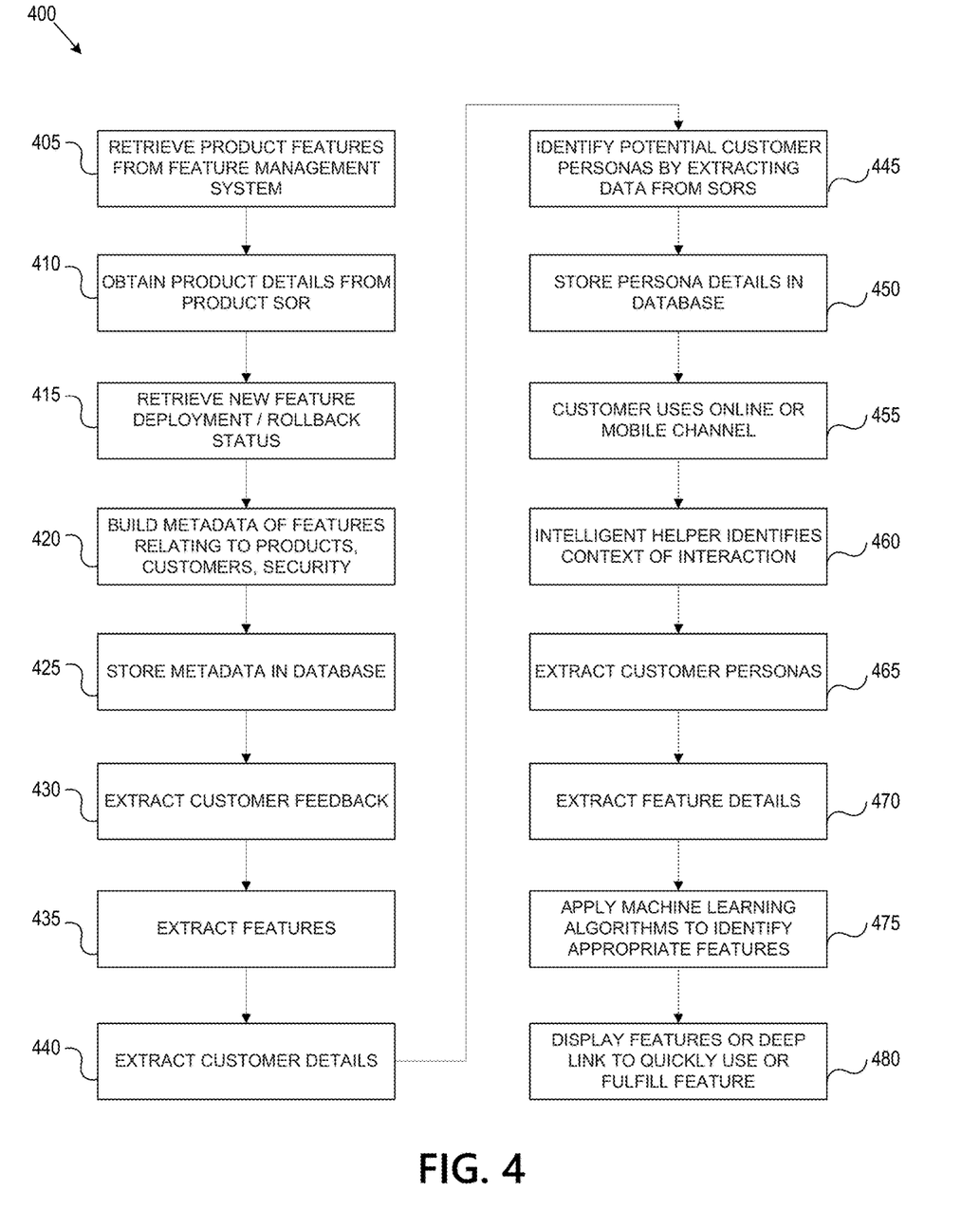
FIG. 4 shows an illustrative event sequence for implementing example embodiments according to one or more aspects of the disclosure.

FIG. 4 depicts an illustrative event sequence 400 in accordance with one or more example embodiments. At step 405 the computing system 100 may retrieve product features from the feature management system 310. At step 410 the computing system 100 may obtain product details from the product SOR 315. At step 415 the computing system 100 may retrieve new feature deployment/rollback information from the release management system 320. At step 420 the computing system 100 may build metadata 325 pertaining to products (including versions and associated information), customer information, and security settings. At step 425, metadata may be generated and stored in feature database 335. At step 430, the computing system 100 may extract and process customer feedback 330. At step 435, the computing system 100 may extract features (along with their associated metadata) from the feature database 335. At step 440, the computing system 100 may extract customer details from customer SOR 340. At step 450, the computing system 100 may identify targeted customer personas 345. At step 455, a user may initiate a client session 355 such as on an online/mobile channel. At step 460, the intelligent feature agent 360 may identify the context of the client session 355. At step 465, the intelligent feature agent 360 may extract customer personas 350 and, at step 470, feature details from the feature database 335. At step 475, the intelligent feature agent 360 may apply machine learning algorithms to identify which feature(s) and which user interface option(s) should be displayed in the ensuing step 480.

Figure 5A:
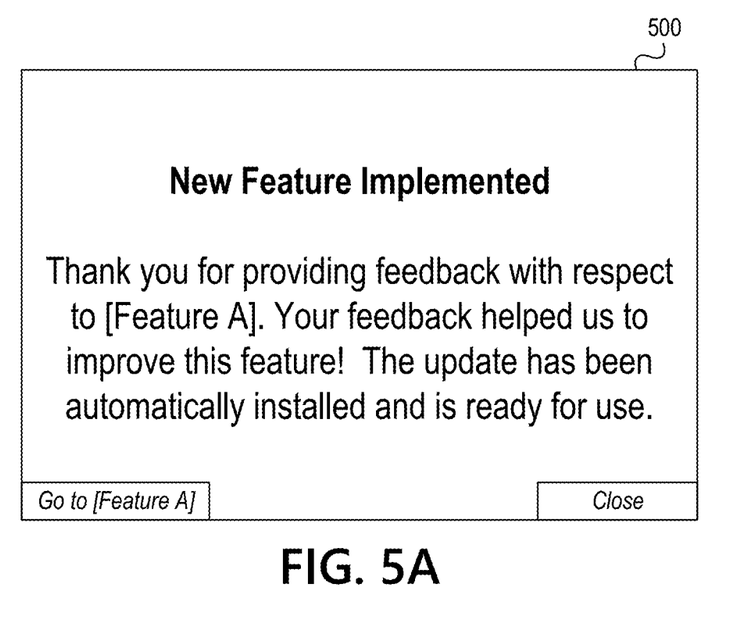
FIGS. 5A and 5B show examples of graphical user interfaces in accordance with one or more aspects of the disclosure.
Figure 5B:
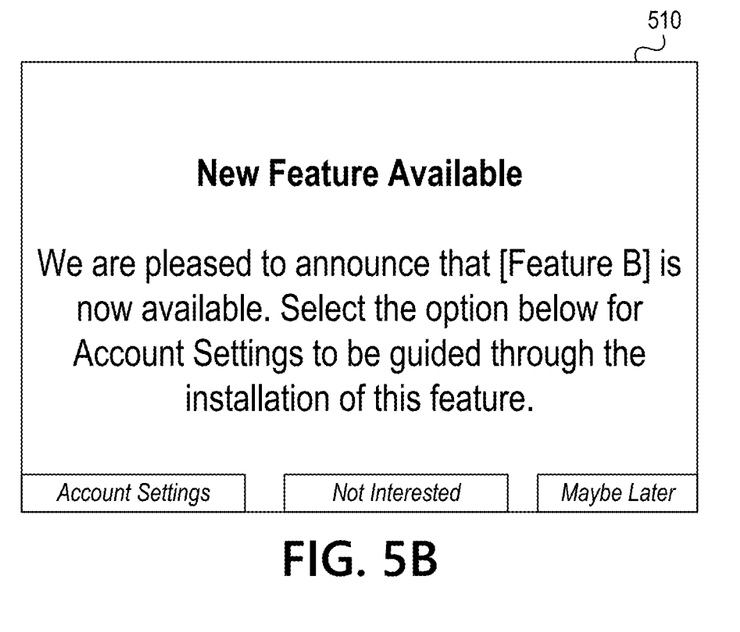

Depending on the particulars of the new or changed feature and other factors including the customer persona, user interfaces generated by the computing system 100 may be in a variety of types. Examples of user interfaces are shown in FIGS. 5A and 5B. In some examples, feature updates may be automatically installed on a remote client device in which case, as shown in FIG. 5A, a user interface 500 may alert the user to the new or changed feature. The interface 500 may refer to prior feedback the user provided with respect to the feature (where applicable) and also may include an option to engage the new or changed feature, as shown in the lower left-hand corner of FIG. 5A.

In other examples, user interfaces may solicit input to determine whether the user wishes to install and/or use the new or changed feature. The interface may include a simple yes-or-no option to install or activate the new or changed feature. Alternatively, as shown in FIG. 5B, an interface 510 may include an option (lower left-hand corner) to launch a tutorial that guides the user through the installation and/or use of the new or changed feature. The interface 510 may include other options, as shown, for the user to indicate he or she is not interested in the new feature, or request that the installation be deferred until a later time. If this latter option is selected, the computing system 100 may display the interface 510 again after a predetermined interval, e.g., one week.

The intelligent helper agent 360 may transmit any or all responses selected on the user interfaces 500, 510 to the computing system 100 as data that may be used to update individual and/or targeted customer personas. For example, prior user feedback that may have been the original impetus for notifying a user of a feature update may have been addressed in a prior update such that the user no longer wishes to be notified of further updates to the feature. More generally, when users repeatedly select "not interested" for feature updates, their customer personas may be updated to reduce the frequency of notifications, e.g., notifications may be limited to situations where a new feature closely corresponds to specific feedback provided by the user. Conversely, notifications may be transmitted more frequently to users who interact more regularly with respect to feature updates.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

We claim:

1. A computing platform, comprising:
   at least one processor;
   a communication interface communicatively coupled to the at least one processor; and
   memory storing computer-readable instructions that, when executed by the at least one processor, cause the computing platform to:
   establish a first connection, via the communication interface, with a remote client device and, while the first connection is established, initiate a first client session;

establish a second connection, via the communication interface, with an intelligent helper agent and, while the second connection is established, receive new feature information, via the communication interface, relevant to the first client session as determined by comparing the new feature information to a first client persona; and transmit a first notification, via the communication interface, to the remote client device which, when executed by the remote client device, causes the first notification to be displayed on the remote client device.

2. The computing platform of claim 1, wherein the computer-readable instructions, when executed by the at least one processor, cause the computing platform to establish a connection with a database storing information relating to historical product updates, client feedback, and client usage patterns, and wherein the computing platform creates the first client persona based, at least in part, on the database information.

3. The computing platform of claim 2, wherein the intelligent helper agent determines whether the new feature information is relevant to the first client session by comparing the first client persona to a machine learning dataset.

4. The computing platform of claim 1, wherein the computer-readable instructions, when executed by the at least one processor, cause the computing platform to establish a third connection with the remote client device and, while the third connection is established, initiate a second client session executing the new feature information responsive to instructions received from the remote client device.

5. The computing platform of claim 1, wherein the computer-readable instructions, when executed by the at least one processor, cause the computing platform to execute the new feature information on the remote client device upon determining that automatic execution is appropriate based on the first client persona.

6. The computing platform of claim 1, wherein the computer-readable instructions, when executed by the at least one processor, cause the computing platform to establish a third connection with the remote client device and, while the third connection is established, initiate a second client session containing instructions for guiding a user through installation of the new feature information on the remote client device.

7. A method, comprising:
at a computing platform comprising at least one processor, memory, and a communication interface:
establishing a first connection, via the communication interface, with a remote client device and, while the first connection is established, initiating a first client session;
establishing a second connection, via the communication interface, with an intelligent helper agent and, while the second connection is established, receiving new feature information, via the communication interface, relevant to the first client session as determined by comparing the new feature information to a first client persona; and
transmitting a first notification, via the communication interface, to the remote client device which, when executed by the remote client device, causes the first notification to be displayed on the remote client device.

8. The method of claim 7, further comprising establishing a connection, via the communication interface, with a database storing information relating to historical product updates, client feedback, and client usage patterns, and creating the first client persona based, at least in part, on the database information.

9. The method of claim 8, further comprising a step of the intelligent helper agent determining whether the new feature information is relevant to the first client session by comparing the first client persona to a machine learning dataset.

10. The method of claim 7, further comprising establishing a third connection, via the communication interface, with the remote client device and, while the third connection is established, initiating a second client session executing the new feature information responsive to instructions received from the remote client device.

11. The method of claim 7, further comprising a step of executing, via the communication interface, the new feature information on the remote client device upon determining that automatic execution is appropriate based on the first client persona.

12. The method of claim 7, further comprising establishing a third connection, via the communication interface, with the remote client device and, while the third connection is established, initiating a second client session containing instructions for guiding a user through installation of the new feature information on the remote client device.

13. One or more non-transitory computer-readable media storing instructions that, when executed by a computing platform comprising at least one processor, memory, and a communication interface, cause the computing platform to:
establish a first connection, via the communication interface, with a remote client device and, while the first connection is established, initiate a first client session;
establish a second connection, via the communication interface, with an intelligent helper agent and, while the second connection is established, receive new feature information, via the communication interface, relevant to the first client session as determined by comparing the new feature information to a first client persona; and
transmit a first notification, via the communication interface, to the remote client device which, when executed by the remote client device, causes the first notification to be displayed on the remote client device.

14. The non-transitory computer-readable media of claim 13, wherein the computer-readable instructions, when executed by the at least one processor, cause the computing platform to establish a connection with a database storing information relating to historical product updates, client feedback, and client usage patterns, and wherein the computing platform creates the first client persona based, at least in part, on the database information.

15. The non-transitory computer-readable media of claim 14, wherein the intelligent helper agent determines whether the new feature information is relevant to the first client session by comparing the first client persona to a machine learning dataset.

16. The non-transitory computer-readable media of claim 13, wherein the computer-readable instructions, when executed by the at least one processor, cause the computing platform to establish a third connection with the remote client device and, while the third connection is established, initiate a second client session executing the new feature information responsive to instructions received from the remote client device.

17. The non-transitory computer-readable media of claim 13, wherein the computer-readable instructions, when executed by the at least one processor, cause the computing platform to execute the new feature information on the remote client device upon determining that automatic execution is appropriate based on the first client persona.

18. The non-transitory computer-readable media of claim 13, wherein the computer-readable instructions, when executed by the at least one processor, cause the computing platform to establish a third connection with the remote client device and, while the third connection is established, initiate a second client session containing instructions for guiding a user through installation of the new feature information on the remote client device.

* * * * *